United States Patent

[11] 3,587,515

[72] Inventor Erik Arne Anderson
      Hagersten, Sweden
[21] Appl. No. 857,502
[22] Filed Sept. 12, 1969
[45] Patented June 28, 1971
[73] Assignee Aktiebolaget Electrolux
      Stockholm, Sweden
[32] Priority Sept. 17, 1968
[33] Sweden
[31] 12,500/1968

[54] PRESSURE DIFFERENTIAL INDICATING MEANS
      10 Claims, 1 Drawing Fig.
[52] U.S. Cl. .................................................. 116/70,
      15/339, 55/274, 73/208, 116/70, 116/114,
      200/81.9, 210/90
[51] Int. Cl. .................................................. G01l 19/12
[50] Field of Search .................................. 116/65, 70,
      112, 114, 117; 73/194, 207, 208, 209; 210/85, 90;
      15/339; 200/81.9; 137/(Inquired); 55/270, 274

[56] References Cited
            UNITED STATES PATENTS
2,136,261  11/1938  Anderson ................... 116/117X
2,192,224   3/1940  Forsberg .................... 116/114X
2,244,552   6/1941  DeLaney .................... 73/208
2,325,188   7/1943  Lofgren ...................... 55/274
2,327,181   8/1943  Dunbar ...................... 116/114X
3,119,369   1/1964  Harland et al. ............ 116/114
3,381,652   5/1968  Schaefer et al. .......... 116/114
3,443,365   5/1969  Lee et al. ................... 55/274

Primary Examiner—Louis J. Capozi
Attorney—Edmund A. Fenander

ABSTRACT: This invention relates to equipment for indicating a predetermined pressure differential between gaseous fluids at low and higher pressures. A hollow sleeve of conical form has an inner tapered wall. The large end of the hollow sleeve is in communication with the gaseous fluid at the higher pressure and its small end is in communication with the gaseous fluid at the low pressure. A movable member of conical form, which has a tapered outer wall, is disposed within the hollow sleeve with the small end of the member at the small end of the sleeve. The member, which is spring biased from the small end of the sleeve, has a signaling system part mounted thereon. The part and member are in one position with respect to the sleeve when the pressure differential between the gaseous fluids is less than a predetermined value and in a second position with respect to the sleeve when the pressure differential between the gaseous fluids is at the predetermined value. The relative position of the part and member with respect to the sleeve is dependent upon the velocity of air flowing from the large to the small end of the sleeve through a gap between the sleeve and member. The part in its second position signals that the pressure differential between the gaseous fluids is at the predetermined value.

PATENTED JUN 28 1971 3,587,515
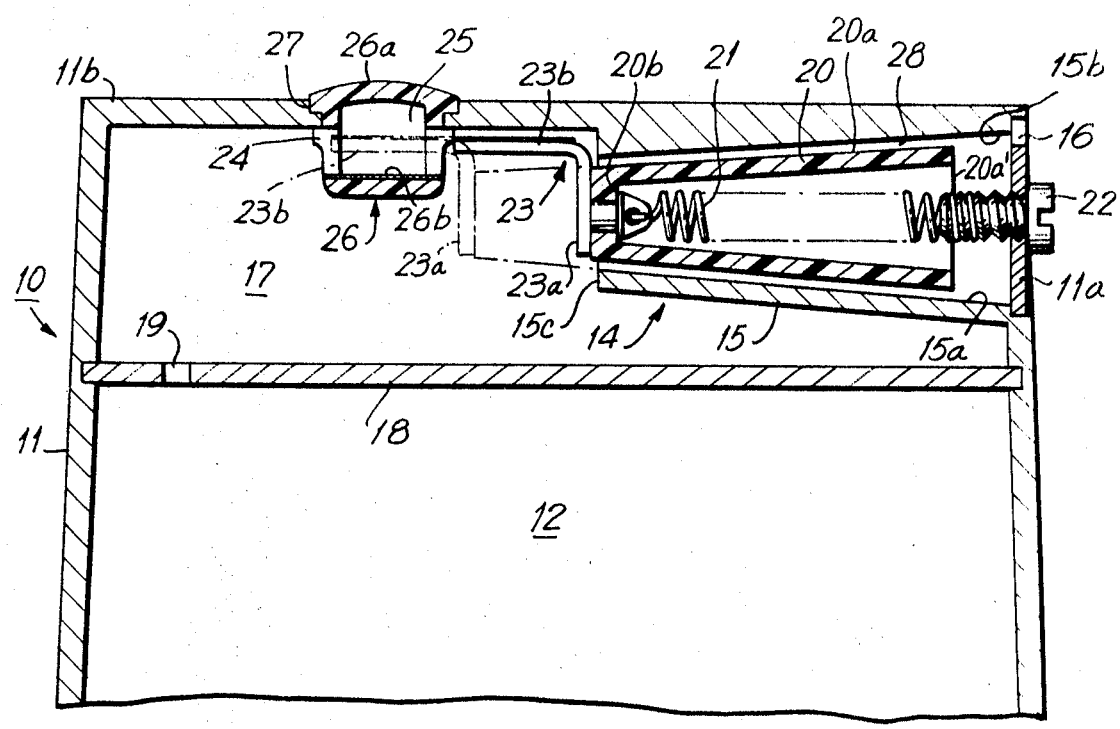

3,587,515

PRESSURE DIFFERENTIAL INDICATING MEANS

SUMMARY OF THE INVENTION

It is an object of my invention to provide an improved means for indicating a predetermined pressure differential between gaseous fluids at low and higher pressures. I accomplish this by providing indicating means comprising a hollow sleeve of conical form which has an inner tapered wall and a movable member of conical form which is disposed within the hollow sleeve and has a tapered outer wall. The small and large ends of the movable member are respectively at the small and large ends of the sleeve. The small and large ends of the hollow sleeve are respectively in communication with the gaseous fluids at the low and higher pressures.

Further, the movable member is biased from the small end of the sleeve and has a part thereon which forms a component of a signaling system. The part and member are in one position with respect to the sleeve when the pressure differential between the gaseous fluids is less than a predetermined value and in a second position with respect to the sleeve when the pressure differential between the gaseous fluids at least at the predetermined value. The relative position of the part and member with respect to the sleeve is dependent upon the velocity of air flowing from the large to the small end of the sleeve through a gap between the sleeve and member.

BRIEF DESCRIPTION OF THE DRAWINGS

In the drawings, the single figure is a fragmentary sectional view of apparatus which has a space maintained at a vacuum and is provided with pressure differential indicating means embodying my invention.

DESCRIPTION OF THE PREFERRED EMBODIMENT

Referring to the drawing, I have shown my invention as applied to apparatus 10 having a casing 11 provided with a space or chamber 12 which is maintained at a vacuum or subatmospheric pressure in any suitable manner. In apparatus of the kind being described, such as a vacuum cleaner, for example, it is desirable to employ means to indicate when the vacuum or subatmospheric pressure in the chamber 12 reaches a predetermined pressure below atmospheric pressure.

In accordance with my invention I provide a pressure differential indicating means 14 for indicating a predetermined pressure differential between atmospheric pressure and the vacuum or subatmospheric pressure produced in the chamber 12. The indicating means 14 is disposed within the casing 11 and includes a stationary hollow sleeve or cylinder 15 of conical form having a tapered inner wall 15a. The large end 15b of the conical sleeve 15 extends to and is closed off by a removably secured wall part 11a of the casing 11 which has an opening 16 so that the end 15b of the conical sleeve 15 is in communication with ambient air at atmospheric pressure.

The small end 15c of the stationary conical sleeve 15 is in communication with a chamber 17 which is adjacent to the chamber 12 and separated therefrom by a partition 18 having an opening 19. Hence, the small end 15c of the conical sleeve is in communication with air in the chamber 17 which is at the vacuum or subatmospheric pressure maintained in the chamber 12.

A movable member or piston 20 of conical form, which has a tapered outer wall 20a of generally the same configuration as the inner wall 15a of the stationary sleeve is axially positioned within the sleeve 15, and movable therein in its lengthwise direction. The piston 20 is hollow with its large open end 20a' near the wall part 11a of the casing 11 in which the opening 16 is provided. The piston 20 is resiliently biased toward the right in the drawing by a helical spring 21, one end of which is fixed to the small closed end 20b of the piston and the opposite end of which is fixed to a screw 22 extending through the wall part 11a of the casing 11, so that the biasing action of the spring 21 can readily be adjusted.

A vertical arm 23a of an L-shaped part 23 is fixed to the closed end 20b of the conical piston 20, the horizontal arm 23b of which is movable through slots 24 into and from the interior 25 of a hollow body 26 anchored in an opening 27 in the top wall 11b of the casing 11. The body 26 us provided with a top wall 26a formed of transparent material. The bottom wall 26b of the body 26 and the horizontal arm 23b of the L-shaped part 23, which is flat and overlies the bottom wall 26b of the body 26 in its dotted line position in the drawing, are colored. For example, the bottom wall 26b of the body 26 can be colored green and the flat horizontal arm 23b of the L-shaped part 23 can be colored red.

When the L-shaped part 23 is in its solid line position in the drawing, the flat horizontal arm 23b thereof is outside the body 26 and hence the green colored bottom 26b of the body will be visible through the transparent top wall 26a thereof. When the L-shaped part 23 is in its dotted line position in the drawing, the flat horizontal arm 23b thereof is in the interior 25 of the body 26 and the red colored flat horizontal arm 23b of the L-shaped part 23 will be visible through the transparent top wall 26a of the body 26.

The conical piston 20, L-shaped part 23 and hollow body 26 all can be formed of suitable plastic material. By making the conical piston 20 of plastic material having a relatively thin wall 20, the weight of the movable element of the indicating means 14 will be very low and no special provision will be necessary to center the conical piston within the stationary sleeve 15, as will be explained presently, to maintain a gap 28 between the sleeve and piston which is of substantially uniform width about the entire periphery of the piston. Although not shown, it also will be understood that the piston 20 can be provided with a suitable bearing movable lengthwise of an elongated pin supported in any suitable manner within the hollow sleeve 15, so that the piston 20 will be centered within the sleeve.

When a vacuum or subatmospheric pressure is maintained in the chamber 12 during operation of the apparatus 10, ambient air at atmospheric pressure will enter the large end 15b of the hollow sleeve 15 through the opening 16 in the wall part 11a due to the fact that the chamber 17, which is in communication with the chamber 12 through the opening 19 in the partition 18, also is at a vacuum or subatmospheric pressure. Under these conditions ambient air entering the large end of the conical sleeve 15 will flow through the gap 28 into the chamber 17.

When the pressure differential between the ambient air and air in the chamber 17 is less than a predetermined value, the piston 20 will move to a position within the hollow sleeve at which the width of the gap 28 is in the neighborhood of about ½ to 1 mm., for example. This position of the piston 20, which tends to move toward the left in the drawing with flow of air from right to left through the gap 28, is counteracted by the biasing action of the spring 21. The air flowing through the gap 28, which is of annular form and is disposed about the entire periphery of the piston 20, functions to center the piston 20 axially of the sleeve 15 and maintain the width of the gap 28 substantially the same about the piston.

When the pressure differential between the ambient air and air in the chamber 17 is at a predetermined value, the air flowing through the gap 28 from the large end 15b to the small end 15c of the sleeve 15 will impart movement to the piston 20 and the latter will move toward the small end 15c of the sleeve 15. An important operating feature of the indicating means 14 is that, under conditions where such movement imparted to the piston 20 is very small and not very great, such slight movement of the piston 20 toward the left in the drawing will decrease the width of the gap 28 due to the fact that the sleeve 15 and piston 20 are of conical form. Such decrease in the width of the gap 28 in turn will cause the air to flow through the gap 28 at a higher velocity toward the small end 15c of the sleeve 15. This in turn imparts more movement to the piston 20 and the latter moves further toward the small end 15c of the sleeve 15. The successive increases in velocity of the air through the gap 28 and the successive increments of movement imparted to the piston 20 take place very fast so that, when initial movement is imparted to the piston 20 responsive to a predetermined pressure difference between ambient air at atmospheric pressure and air at vacuum or subatmospheric pressure in chamber 12, the piston 20 moves quickly practically in a single stroke to shift the closed end 20a of the piston 20 from its solid to its dotted line position in the drawing. When this occurs the green colored bottom 26b of the body 26 no longer will be visible through the transparent top wall 26a thereof and only the red-colored flat horizontal arm 23b of the L-shaped part 23 will be seen through the transparent top wall 26a.

In view of the foregoing, it will now be understood that the horizontal flat arm 23b of the L-shaped part 23 shifts quickly from its solid to its dotted line position in the drawing when the pressure differential between the ambient air at atmospheric pressure and the air at a vacuum or subatmospheric pressure is at a predetermined value, thus giving a positive indication that this operating condition has occurred. Further, the parts of the pressure differential indicating means 14 are so related to one another that a relatively long path of movement is provided for the piston 20 to shift the flat horizontal arm 23b from its solid line to its dotted line position in the drawing, so that malfunctioning can never occur.

The relative position of the L-shaped part 23 and member 20 with respect to the sleeve 15 is dependent, as pointed out above, upon the velocity of air flowing from the large end 15b to the small end 15c of the sleeve through the gap 28 between the sleeve 15 and member 20. The part 23 and member 20 are in the solid line position in the drawing with respect to the sleeve 15 when the pressure differential between ambient air and subatmospheric air in chamber 12 is less than a predetermined value and in the dotted line position in the drawing with respect to the sleeve when the pressure differential between ambient air and subatmospheric air in the chamber 12 is at the predetermined value. The part 23 in its dotted line position in the drawing, as explained above, signals that the pressure differential between ambient air and air in the chamber 12 is at the predetermined value.

I claim:

1. Means for indicating a predetermined pressure differential between a first gaseous fluid at a first pressure and a second gaseous fluid at a second lower pressure, said indicating means comprising:
   a. a hollow sleeve having an inner tapered wall surface of conical form, the large end of said hollow sleeve being in communication with the first gaseous fluid at the first pressure and the small end thereof being in communication with the second gaseous fluid at the second lower pressure;
   b. an elongated member having a tapered outer surface of conical form, said member being disposed within said hollow sleeve and axially movable therein with the small and large ends thereof respectively at the small and large ends of said sleeve;
   c. said hollow sleeve and said member having spaced inner and outer surfaces, respectively, defining a gap therebetween which is of conical form and through which gaseous fluid flows from the large end to the small end of said sleeve;
   d. signal means;
   e. means including said member in a first axial position within said sleeve to render said signal means ineffective and in a second axial position within said sleeve, which is nearer to the small end thereof, to render said signal means effective;
   f. said member being axially movable within said sleeve to said first position responsive to a pressure differential between the first and second gaseous fluids which is less than a predetermined value;
   g. said member being axially movable within said sleeve to said second position responsive to a pressure differential between the first and second gaseous fluids which is at least at the predetermined value; and
   h. said member, when movement thereof is initiated from its first position to its second position responsive to a pressure differential between the first and second gaseous fluids which is at least at the predetermined value, functioning to decrease the width of said gap due to the conical from of said hollow sleeve and said member, whereby the velocity of the gaseous fluid flowing through said gap from the large end to the small end of said hollow sleeve will increase rapidly in small increments and promote movement of said member practically in a single stroke to its second position and positively render said signal means effective when the pressure differential between the first and second gaseous fluids is at least at the predetermined value.

2. Indicating means as set forth in claim 1 in which said gap between said hollow sleeve and said member, when said member is in said first axial position within said sleeve, is in a range of from ½ to 3 mm.

3. Indicating means as set forth in claim 1 which includes structure tending to restrain movement of said member from said first axial position to said second axial position within said sleeve.

4. Indicating means as set forth in claim 3 in which said restraining structure comprises resilient means for biasing said member from the small end toward the large end of said sleeve.

5. Indicating means as set forth in claim 1 in which said member comprises a hollow cone section formed of lightweight material, such as plastic, for example, having a thin wall, the small end of said cone section being closed and serving as the small end of said member.

6. Indicating means as set forth in claim 5 which includes elongated spring means for resiliently biasing said hollow cone section from the small end toward the large end of said sleeve, said spring means extending axially within said hollow cone section and having one end fixed to the closed end thereof.

7. Indicating means as set forth in claim 1 in which said signal means includes a visual indicator and means hiding said visual indicator from view when said member is in said first position within said sleeve, said hiding means being ineffective when said member is in its second position within said sleeve whereby said visual indicator is visible to signal that the pressure differential between the first and second gaseous fluids is at least at the predetermined value.

8. Indicating means as set forth in claim 7 in which said signal means includes a transparent sight element, said visual indicator in said second position of said member within said sleeve being visible through said sight element and hidden from view by said hiding means in said first position of said member within said sleeve.

9. Means for indicating a predetermined pressure differential between ambient air at atmospheric pressure and air at a vacuum or subatmospheric pressure, as in that part of the path of flow of air in a vacuum cleaner which is between the dust bag and motor-fan unit, for example, said indicating means comprising:
   a. a hollow sleeve having an inner tapered wall surface of conical form, the large end of said hollow sleeve being in communication with ambient air and the small end thereof being in communication with air at subatmospheric pressure;
   b. an elongated member having a tapered outer surface of conical form, said member being disposed within said hollow sleeve and axially movable therein with the small and large ends thereof respectively at the small and large ends of said sleeve;
   c. means for resiliently biasing said member from the small end toward the large end of said sleeve;
   d. said hollow sleeve and said member having spaced inner and outer surfaces, respectively, defining a gap therebetween which is of conical form and through which air flows from the large end to the small end of said sleeve;

e. signal means;

f. means including said member in a first axial position within said sleeve to render said signal means ineffective and in a second axial position within said sleeve, which is nearer to the small end thereof, to render said signal means effective;

g. said member being axially movable within said sleeve to said first position responsive to a pressure differential between ambient air and air at subatmospheric pressure which is less than a predetermined value;

h. said member being axially movable within said sleeve to said second position responsive to a pressure differential between ambient air and air at subatmospheric pressure which is at least at the predetermined value; and i. said member, when movement thereof is initiated from its first position to its second position to responsive to a pressure differential between ambient air and air at subatmospheric pressure which is at least at the predetermined value, functioning to decrease the width of said gap due to the conical form of said hollow sleeve and said member, whereby the velocity of air flowing through said gap from the large end to the small end of said hollow sleeve will increase rapidly in small increments and promote movement of said member practically in a single stroke to its second position and positively render said signal means effective when the pressure differential between ambient air and air at subatmospheric pressure is at least at the predetermined value.

10. Apparatus comprising:

a. structure defining a first space for holding a body of air maintained at a vacuum or subatmospheric pressure, such as in a vacuum cleaner, for example, b. said structure including wall means defining a second space for holding a body of air in communication with the air in said first space;

c. means for indicating a predetermined pressure differential between ambient air enveloping the apparatus and air in said first space, said indicating means comprising:

d. a hollow sleeve having an inner tapered wall surface of conical form, the large end of said hollow sleeve being in communication with ambient air enveloping the apparatus and the small end thereof being disposed in said second space and in communication with air at subatmospheric pressure therein;

e. an elongated member having a tapered outer surface of conical form, said member being disposed within said hollow sleeve and axially movable therein with the small and large ends thereof respectively at the small and large ends of said sleeve;

f. said hollow sleeve and said member having spaced inner and outer surfaces; respectively, defining a gap therebetween which is of conical form and through which air flows from the large end to the small end of said sleeve;

g. means for resiliently biasing said member from the small end toward the large end of said sleeve, h. signal means;

i. means including said member in a first axial position within said sleeve to render said signal means ineffective and in a second axial position within said sleeve, which is nearer to the small end thereof, to render said signal means effective;

j. said member being axially movable within said sleeve to said first position responsive to a pressure differential between ambient air and air at subatmospheric pressure which is less than a predetermined value;

k. said member being axially movable within said sleeve to said second position responsive to a pressure differential between ambient air and air at subatmospheric pressure which is at least at the predetermined value, l. said member, when movement thereof is initiated from its first position to its second position responsive to a pressure differential between ambient air and air at subatmospheric pressure which is at least at the predetermined value, functioning to decrease the width of said gap due to the conical form of said hollow sleeve and said member, whereby the velocity of air flowing through said gap from the large end to the small end of said hollow sleeve will increase rapidly in small increments and promote movement of said member practically in a single stroke to its second position and positively render said signal means effective when the pressure differential between ambient air and air at subatmospheric pressure is at least at the predetermined value.